(12) United States Patent
Kamo et al.

(10) Patent No.: US 9,885,842 B2
(45) Date of Patent: Feb. 6, 2018

(54) WAVELENGTH-MULTIPLEXING OPTICAL COMMUNICATION MODULE

(71) Applicant: Mitsubishi Electric Corporation, Tokyo (JP)

(72) Inventors: Yoshiyuki Kamo, Tokyo (JP); Nobuo Ohata, Tokyo (JP); Akihiro Matsusue, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 15/173,747

(22) Filed: Jun. 6, 2016

(65) Prior Publication Data

US 2017/0115459 A1    Apr. 27, 2017

(30) Foreign Application Priority Data

Oct. 27, 2015 (JP) ................. 2015-210486

(51) Int. Cl.
| | |
|---|---|
| G02B 6/28 | (2006.01) |
| G02B 6/42 | (2006.01) |
| H04J 14/02 | (2006.01) |
| G02B 6/293 | (2006.01) |
| G02B 6/32 | (2006.01) |

(52) U.S. Cl.
CPC ......... *G02B 6/4244* (2013.01); *G02B 6/2938* (2013.01); *G02B 6/29365* (2013.01); *G02B 6/32* (2013.01); *G02B 6/4239* (2013.01); *H04J 14/02* (2013.01)

(58) Field of Classification Search
CPC .......... G02B 6/4244; G02B 6/29365; G02B 6/2938; G02B 6/32; G02B 6/4239; H04J 14/02

USPC ...................................... 385/24, 80
See application file for complete search history.

(56) References Cited

U.S. PATENT DOCUMENTS

| | | | | | |
|---|---|---|---|---|---|
| 5,671,315 | A | * | 9/1997 | Tabuchi | G02B 6/4208 385/137 |
| 5,675,684 | A | * | 10/1997 | Hirataka | G02B 6/4232 385/88 |
| 8,792,755 | B2 | * | 7/2014 | Tanaka | G02B 6/122 257/E21.499 |
| 8,888,381 | B2 | * | 11/2014 | Hashiguchi | G02B 6/4274 257/E33.066 |
| 9,258,467 | B2 | * | 2/2016 | Wong | H04N 5/2257 |
| 9,387,608 | B2 | * | 7/2016 | Kotani | B29C 45/0001 |

(Continued)

FOREIGN PATENT DOCUMENTS

| | | | |
|---|---|---|---|
| JP | 63081639 A | * | 4/1988 |
| JP | 2013-205629 A | | 10/2013 |

(Continued)

*Primary Examiner* — Ellen Kim
(74) *Attorney, Agent, or Firm* — Studebaker & Brackett PC

(57) ABSTRACT

A wavelength-multiplexing optical communication module includes: a substrate; a plurality of light sources on the substrate; a plurality of joint materials separately disposed on the substrate at positions respectively corresponding to the plurality of light sources; and a plurality of optical components fixed on the substrate by means of the plurality of joint materials respectively, wherein the substrate includes a plurality of forming portions which respectively form peripheries of the plurality of joint materials into shapes of circles or regular polygons having an even number of vertices.

9 Claims, 3 Drawing Sheets

(56) References Cited

U.S. PATENT DOCUMENTS

| | | | |
|---|---|---|---|
| 2003/0211324 A1* | 11/2003 | Brinkman | A44C 15/007 428/403 |
| 2004/0240773 A1* | 12/2004 | Kobinata | H01L 31/12 385/14 |
| 2010/0221016 A1* | 9/2010 | Tanaka | G02B 6/4214 398/138 |
| 2014/0321856 A1 | 10/2014 | Saeki et al. | |
| 2014/0374870 A1* | 12/2014 | Lee | H01L 27/14618 257/466 |
| 2015/0192736 A1 | 7/2015 | Kasahara et al. | |

FOREIGN PATENT DOCUMENTS

| | | |
|---|---|---|
| JP | 2014-026105 A | 2/2014 |
| JP | 2014-102498 A | 6/2014 |

\* cited by examiner

WAVELENGTH-MULTIPLEXING OPTICAL COMMUNICATION MODULE

BACKGROUND OF THE INVENTION

Field

This invention relates to a wavelength-multiplexing optical communication module which performs communication by wavelength-multiplexing a plurality of optical signals differing in wavelength.

Background

A wavelength-multiplexing optical communication module transmits, by using optical components such as optical lenses, wavelength selecting filters and a reflecting mirror, signal lights emitted from a plurality of light sources. The optical lenses are fixed on a substrate with a joint material. The arrangement for wavelength-multiplexing the lights emitted from the plurality of light sources and outputting the multiplexed light to an external optical transmission path requires fixing the optical lenses with high position accuracy.

A conventional wavelength-multiplexing optical communication module is known which has grooves in lattice form provided around each of portions on which optical lenses are mounted to prevent interference between pieces of a resin adhesive for fixing the optical lenses (see, for example, JP 2014-102498, hereinafter Patent Literature 1).

In the wavelength-multiplexing optical communication module described in Patent Literature 1, however, the peripheral shapes of pieces of the resin adhesive applied cannot be uniformly formed and there is, therefore, a possibility of the shape of each piece of the resin adhesive being asymmetric with respect to the position of the optical lens disposed on the optical path. In such a case, because stress acting on the optical lens is asymmetric when the resin adhesive cures and shrinks, a misalignment of the optical lens occurs during curing of the resin adhesive and the optical lens cannot be fixed with high positional accuracy.

SUMMARY

In view of the above-described problem, an object of this invention is to obtain a wavelength-multiplexing optical communication module capable of inhibiting a misalignment of an optical component due to curing shrinkage of a joint material arid fixing the optical component with high positional accuracy.

According to the present invention, a wavelength-multiplexing optical communication module includes: a substrate; a plurality of tight sources on the substrate; a plurality of joint materials separately disposed on the substrate at positions respectively corresponding to the plurality of light sources; and a plurality of optical components fixed on the substrate by means of the plurality of joint materials respectively, wherein the substrate includes a plurality of forming portions which respectively form peripheries of the plurality of joint materials into shapes of circles or regular polygons having an even number of vertices.

In the invention, the peripheries of joint materials disposed on a substrate separately one from another are each formed into the shape of a circle or a regular polygon having an even number of vertices. Thus, stress acting on each optical component when the joint material cures and shrinks is symmetric. As a result, a misalignment of the optical component due to curing shrinkage of the joint material is inhibited and the optical component can be fixed with high positional accuracy.

DESCRIPTION OF EMBODIMENTS

First Embodiment

Figure 1:
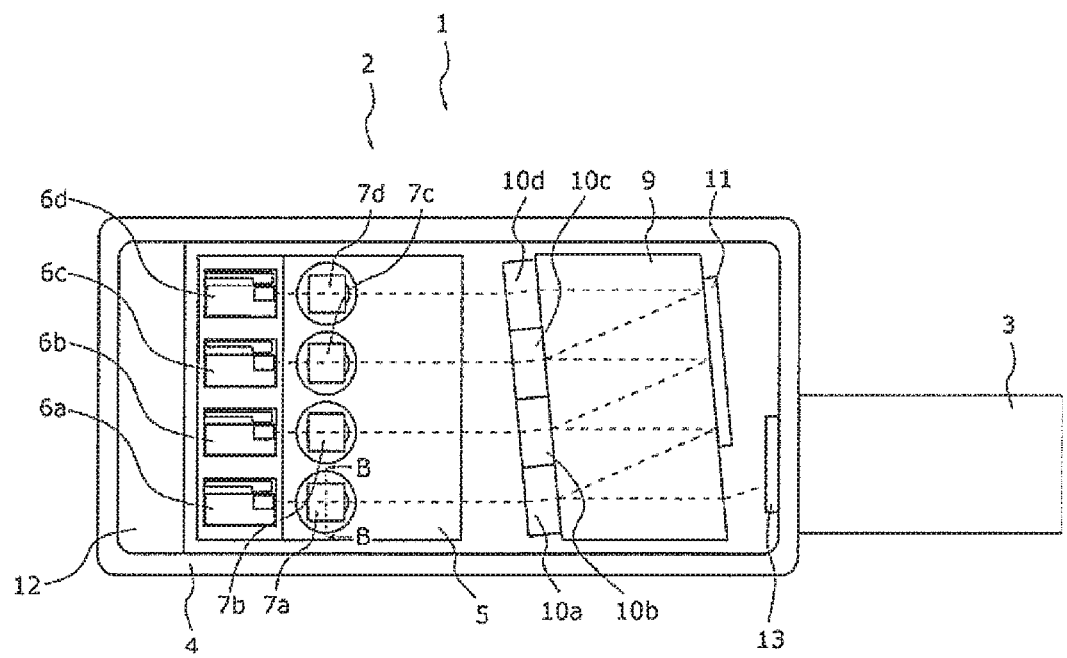
FIG. 1 is a diagram schematically showing the wavelength-multiplexing optical communication module according to the first embodiment of the present invention.

A wavelength-multiplexing optical communication module according to a first embodiment of this invention will be described. FIG. 1 is a diagram schematically showing the wavelength-multiplexing optical communication module according to the first embodiment.

The construction of a wavelength-multiplexing optical communication module according to the first embodiment will first be described. The wavelength-multiplexing optical communication module 1 is constituted by a main body 2 and a receptacle 3. The main body 2 has a package 4 in which a Peltier element (not shown) is fixed with solder. A substrate 5 is fixed on an upper surface of the Peltier element with solder, and light sources 6a to 6d are fixed on an upper surface of the substrate 5 with solder. The light sources 6a to 6d are connected to a feed-through part 12 by gold wires (not shown) and are driven from the outside through the feed-through part 12.

Figure 2:
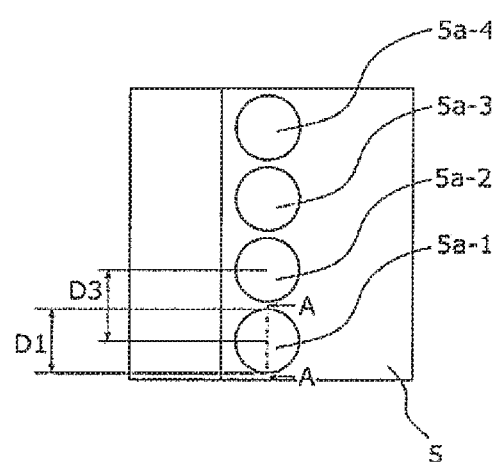
FIG. 2 is a top view showing the substrate according to the first embodiment of the present invention.
Figure 3:
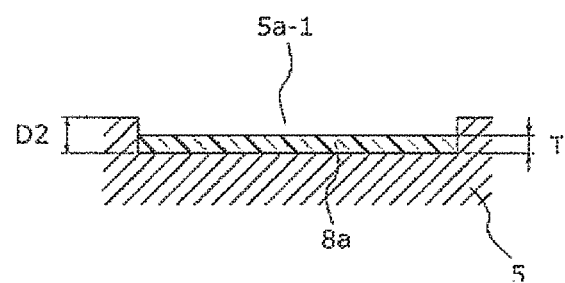
FIG. 3 is an enlarged sectional view showing the substrate according to the first embodiment of the present invention.
Figure 4:
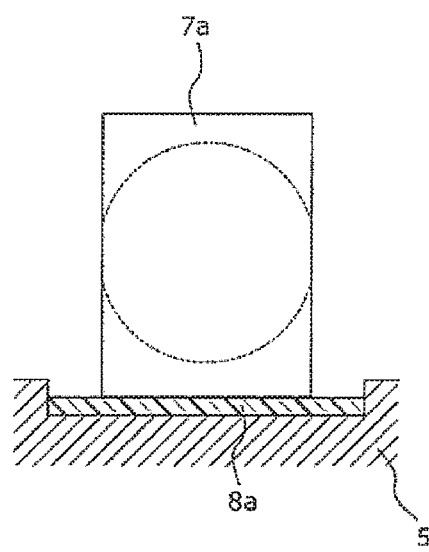
FIG. 4 is an enlarged sectional view showing a major part of the wavelength-multiplexing optical communication module according to the first embodiment of the present invention.

FIG. 2 is a top view of the substrate 5. FIG. 3 is a sectional view taken along line A-A in FIG. 2, showing a state after application of a piece of resin adhesive 8a on the substrate 5. FIG. 4 is a sectional view taken along line B-B in FIG. 1. Recesses 5a-1 to 5a-4 in the shape of a circle are separately disposed in a row on the substrate 5 at positions respectively corresponding to the light sources 6a to 6d. The recesses 5a-1 to 5a-4 are formed by drilling or etching. For example, the recesses 5a-1 to 5a-4 have a diameter D1 of 0.65 to 1.95 mm, a depth D2 of 0.05 to 0.2 mm, and a center-to-center distance D3 of 0.7 to 2.0 mm between each adjacent pair of the recesses. However, it is necessary that the center-to-center distance D3 he larger by about 0.05 mm or more than the diameter D1, since the recesses 5a-1 to 5a-4 are disposed separately one from another. More specifically, for example, the diameter D1 is 1.5 mm, the depth D2 is 0.2 mm, and the center-to-center distance D3 is 1.7 mm.

Optical lenses 7a to 7d, which are optical components, are fixed on the substrate 5 by means of a joint material, and an ultraviolet curing type of resin adhesive is used as the joint material. Pieces of resin adhesive 8a to 8d fill the recesses 5a-1 to 5a-4, respectively. The pieces of resin adhesive 8a to 8*d* have a thickness T of, for example, 0.02 to 0.2 mm, more specifically 0.05 mm. The recesses 5*a*-1 to 5*a*-4 are forming portions which form the peripheries of the pieces of resin adhesive 8*a* to 8*d*, and which are formed so that the optical lenses 7*a* to 7*d* are at about centers of the recesses 5*a*-1 to 5*a*-4 when the optical lenses 7*a* to 7*d* are respectively disposed on optical axis for lights emitted from light sources 6*a* to 6*d*.

Figure 5:
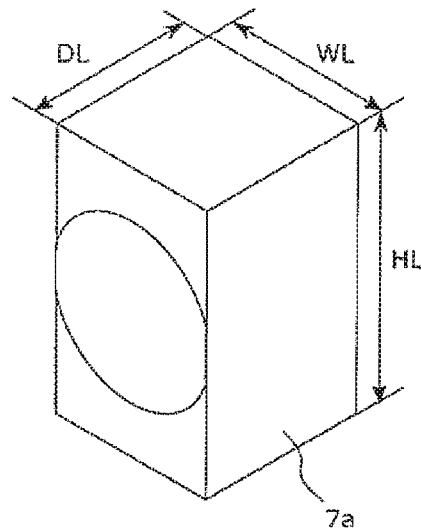
FIG. 5 is a perspective view of the optical lens according to the first embodiment of the present invention.

FIG. 5 is a perspective view of the optical lens 7*a*. For example, the optical lens 7*a* has a height HL of 0.6 to 1.5 mm, a width WL is 0.38 to 1.3 mm, and a depth DL of 0.38 to 1.3 mm. Setting the optical lens 7*a* in the recess 5*a*-1 requires providing a gap of 0.05 mm or more between a wall portion of the recess 5*a*-1 and the optical lens 7*a*. More specifically, for example, the height HL is 1.3 mm, the width WL is 0.9 mm, and the depth DL is 0.9 mm. The optical lenses 7*a* to 7*d* are identical in shape to each other.

A lid (not shown) is welded to the package 4 to hermetically enclose the interior of the package 4. An optical coupler 9 is fixed in the package 4 with a resin adhesive. Wavelength selecting filters 10*a* to 10*d* and a reflecting mirror 11 are provided in the optical coupler 9. A window 13 with seal glass is provided on the package 4. A receptacle 3 is fixed on the package 4 at a position at which signal light passing through the window 13 is output to an external optical transmission path.

The operation of the wavelength-multiplexing optical communication module according to the first embodiment will subsequently be described. The light sources 6*a* to 6*d* are supplied with electrical signals externally and output optical signals of wavelengths λa to λd different from each other. The optical lenses 7*a* to 7*d* respectively adjust the wavefronts of lights emitted from the light sources 6*a* to 6*d* and convert the lights into collimated lights.

The wavelength selecting filter 10*a* has such a characteristic as to transmit light of wavelength λa while reflecting lights of wavelengths λb, λc and λd. Light of wavelength λa exiting from the optical lens 7*a* is passed through the wavelength selecting filter 10*a* to be emitted to the window 13.

The wavelength selecting filter 10*b* has such a characteristic as to transmit light of wavelength λb while reflecting lights of wavelengths λc and λd. Light of wavelength λb exiting from the optical lens 7*b* is passed through the wavelength selecting filter 10*b* and is reflected successively by the reflecting mirror 11 and by the wavelength selecting filter 10*a* to be emitted to the window 13.

The wavelength selecting filter 10*c* has such a characteristic as to transmit light of wavelength λc while reflecting light of wavelength λd. Light of wavelength λc exiting from the optical lens 7*c* is passed through the wavelength selecting filter 10*c* and is reflected successively by the reflecting mirror 11, by the wavelength selecting filter 10*b*, by the reflecting mirror 11 and by the wavelength selecting filler 10*a* to be emitted to the window 13.

The wavelength selecting filter 10*d* has such a characteristic as to transmit light of wavelength λd. Light of wavelength λd exiting from the optical lens 7*d* is passed through the wavelength selecting filter 10*d* and is reflected successively by the reflecting mirror 11, by the wavelength selecting filter 10*c*, by the reflecting mirror 11, by the wavelength selecting filter 10*b*, by the reflecting mirror 11 and by the wavelength selecting filter 10*a* to be emitted to the window 13.

The lights with the wavelengths λa to λd thus emitted to the window 13 are passed through the window 13, wavelength-multiplexed and emitted to the receptacle 3. The wavelength-multiplexed light is output to the external optical transmission path through the receptacle 3. The paths through which the lights emitted from the light sources 6*a* to 6*d* travel are as indicated by the dotted lines in FIG. 1.

A process of manufacturing the wavelength-multiplexing optical communication module according to the first embodiment will subsequently be described. The Peltier element is first fixed in the package 4 with solder. The substrate 5 is fixed on the upper surface of the Peltier element with solder. The light sources 6*a* to 6*d* are thereafter fixed on the upper surface of the substrate 5 with solder.

Subsequently, an ultraviolet curing type of resin adhesive is applied to the package 4, the optical coupler 9 is placed on the resin adhesive, and the resin adhesive is cured by being irradiated with ultraviolet rays, thereby fixing the optical coupler 9 in the package 4.

Subsequently, a piece of the ultraviolet curing type of resin adhesive 8*a* is applied so as to fill the recess 5*a*-1. At this time, the periphery of the piece of resin adhesive 8*a* applied is formed into the shape of a circle since the recess 5*a*-1 has the shape of a circle. The optical lens 7*a* is disposed at about the center of the piece of resin adhesive 8*a*, the light source 6*a* is thereafter caused to emit light, and the position of the optical lens 7*a* is adjusted so that the quantity of light received by a monitoring device set outside the window 13 is maximized. After the completion of the position adjustment, the piece of resin adhesive 8*a* is cured by being irradiated with ultraviolet rays. The optical lens 7*a* is thereby fixed on the substrate 5.

The optical lenses 7*b* to 7*d* are fixed in recesses 5*a*-2 to 5*a*-4 on the substrate 5 in the same way as the optical lens 7*a*.

Each of the peripheries of the pieces of resin adhesive 8*a* to 8*d* is formed into the shape of a circle, as described above. In the shape of the circle, all points on the circumference have the same distance from the center. Therefore, if the shapes of the peripheries of the pieces of resin adhesive 8*a* to 8*d* are circular, each of stresses which act on the pieces of resin adhesive 8*a* to 8*d* during curing shrinkage of the resin adhesive is generated symmetrically about the center of the circle. Thus, misalignments with respect to the adjusted positions of the optical lenses 7*a* to 7*d* respectively placed on the pieces of resin adhesive 8*a* to 8*d* are inhibited.

The lid is welded to the package 4 in a nitrogen atmosphere to hermetically enclose the interior of the package 4. Finally, the receptacle 3 is fixed on the package 4, thereby completing the wavelength-multiplexing optical communication module 1.

The above-described manufacturing process and sequence of manufacturing steps are only an example, and the invention is not limited to the above-described details.

In the first embodiment, the peripheries of the pieces of resin adhesive 8*a* to 8*d* are formed into the shapes of circles with the forming portions constituted by the recesses 5*a*-1 to 5*a*-4 filled with the pieces of resin adhesive 8*a* to 8*d* as a joint material and each having the shape of a circle. Therefore, each of stresses which act on the optical lenses 7*a* to 7*d* placed at about the centers of a pieces of resin adhesive 8*a* to 8*d* during curing shrinkage of the resin adhesive is symmetric about the center of the circle, thereby inhibiting misalignments of the optical lenses 7*a* to 7*d* caused by curing shrinkage of the resin adhesive. Consequently, the optical lenses 7*a* to 7*d* can be fixed with high positional accuracy.

Also, the pieces of resin adhesive 8*a* to 8*d* filling the recesses 5*a*-1 to 5*a*-4 do not interfere with each other since the recesses 5*a*-1 to 5*a*-4 are disposed separately one from another. The plurality of optical lenses 7a to 7d can therefore be fixed with high positional accuracy.

Second Embodiment

Figure 6:
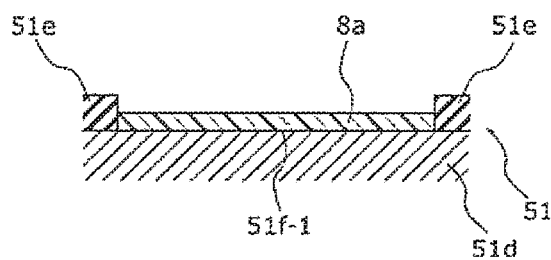
FIG. 6 is an enlarged sectional view showing the substrate according to the second embodiment of the present invention.

A wavelength-multiplexing optical communication module according to a second embodiment of this invention will be described. The difference between the wavelength-multiplexing optical communication module according to the second embodiment and the wavelength-multiplexing optical communication module according to the first embodiment resides in the substrate. In other respects, the arrangement according to the second embodiment is the same as that according to the first embodiment. FIG. 6 is a sectional view showing a state after application of a piece of resin adhesive 8a on a substrate 51 in the wavelength-multiplexing optical communication module according to the second embodiment. The position of the section is the same as that of FIG. 3. The substrate 51 is constituted by a base member 51d and an organic film 51e of a solder resist formed on the base member 51d. When the organic film 51e is formed, joint material application regions 51f-1 to 51f-4, which are regions where pieces of resin adhesive 8a to 8d for fixing the optical lenses 7a to 7d are applied, are masked. Accordingly, the organic film 51e is formed so that the joint material application regions 51f-1 to 51f-4 are left empty. The joint material application regions 51f-1 to 51f-4 each have the shape of a circle and are disposed in a row separately one from another.

The pieces of resin adhesive 8a to 8d are applied so as to fill the joint material application regions 51f-1 to 51f-4, respectively. Wetting and spreading of the pieces of resin adhesive 8a to 8d stop at the organic film 51e. Therefore, the shapes of the peripheries of the pieces of resin adhesives 8a to 8d are respectively determined by the shapes of the joint material application regions 51f-1 to 51f-4. That is, the joint material application regions 51f-1 to 51f-4 and the organic film 51e constitute forming portions which form the peripheries of the pieces of resin adhesive 8a to 3d.

In the second embodiment, the peripheries of the pieces of resin adhesive 8a to 8d are formed into the shapes of circles with the forming portions constituted by the joint material application regions 51f-1 to 51f-4 filled with the pieces of resin adhesive 8a to 3d as a joint material and each having the shape of a circle and the organic film 51e. Therefore, each of stresses which act on the optical lenses 7a to 7d placed at about the centers of the pieces of resin adhesive 8a to 8d during curing shrinkage of the resin adhesive is symmetric about the center of the circle, as is that in the first embodiment. Misalignments of the optical lenses 7a to 7d caused by curing shrinkage of the resin adhesive are inhibited thereby. Consequently, the optical lenses 7a to 7d can be fixed with high positional accuracy.

Also, as in the case of the first embodiment, the pieces of resin adhesive 8a to 8d do not interfere with each other since the joint material application regions 51f-1 to 51f-4 are disposed separately one from another. The plurality of optical lenses 7a to 7d can therefore be fixed with high positional accuracy.

Third Embodiment

Figure 7:
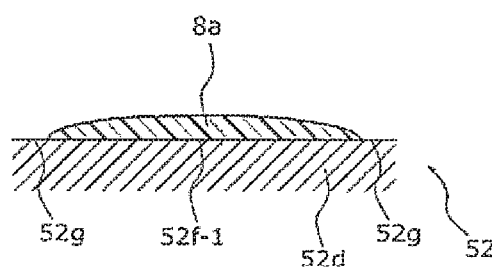
FIG. 7 is an enlarged sectional view showing the substrate according to the third embodiment of the present invention.

A wavelength-multiplexing optical communication module according to a third embodiment of this invention will be described. The difference between the wavelength-multiplexing optical communication module according to the third embodiment and the wavelength-multiplexing optical communication module according to the first embodiment resides in the substrate. In other respects, the arrangement according to the third embodiment is the same as that according to the first embodiment. FIG. 7 is a sectional view showing a state after application of a piece of resin adhesive 8a on a substrate 52 in the wavelength-multiplexing optical communication module according to the third embodiment. The position of the section is the same as that of FIG. 3. Joint material application regions 52f-1 to 52f-4, which are regions where pieces of resin adhesive 8a to 8d are applied, and joint material non-application regions 52g provided on the peripheries of the joint material application regions 52f-1 to 52f-4 are formed on an upper portion of a base member 52d. The substrate 52 is constituted by the base member 52d, the joint material application regions 52f-1 to 52f-4 and the joint material non-application regions 52g. The joint material application regions 52f-1 to 52f-4 are formed of the same polymer material as the pieces of resin adhesive 8a to 8d, and the joint material non-application regions 52g are formed of a fat or oil material. Therefore the wettability of the joint material non-application regions 52g to the resin adhesive is lower than that of the joint material application regions 52f-1 to 52f-4. The joint material application regions 52f-1 to 52f-4 each have the shape of a circle and are disposed in a row separately one from another.

The pieces of resin adhesive 8a to 8d are applied so as to fill the joint material application regions 52f-1 to 52f-4, respectively. Wetting and spreading of the pieces of resin adhesive 8a to 8d stop at the joint material non-application regions 52g having lower wettability to the resin adhesive. Therefore, the shapes of the peripheries of the pieces of resin adhesives 8a to 8d are respectively determined by the shapes of the joint material application regions 52f-1 to 52f-4. That is, the joint material application regions 52f-1 to 52f-4 and the joint material non-application regions 52g constitute forming portions which form the peripheries of the pieces of resin adhesive 8a to 8d.

In the third embodiment, the peripheries of the pieces of resin adhesive 8a to 8d are formed into the shapes of circles with the forming portions constituted by the joint material application regions 52f-1 to 52f-4 filled with the pieces of resin adhesive 8a to 8d as a joint material and each having the shape of a circle and the joint material non-application regions 52g. Therefore, each of stresses which act on the optical lenses 7a to 7d placed at about the centers of the pieces of resin adhesive 8a to 8d during curing shrinkage of the resin adhesive is symmetric about the center of the circle, as is that in the first embodiment. Misalignments of the optical lenses 7a to 7d are inhibited thereby. Consequently, the optical lenses 7a to 7d can be fixed with high positional accuracy.

Also, as in the case of the first embodiment, the pieces of resin adhesive 8a to 8d do not interfere with each other since the joint material application regions 52f-1 to 52f-4 are disposed separately one from another. The plurality of optical lenses 7a to 7d can therefore be fixed with high positional accuracy.

The description has been made by assuming that each of recesses 5a-1 to 5a-4 in the first embodiment, the joint material application regions 51f-1 to 51f-4 in the second embodiment and the joint material application regions 52f-i to 52f-4 in the third embodiment has the shape of a circle. However, the optical lenses 7a to 7d can also be fixed with high positional accuracy when each of the recesses or the regions has the shape of a regular polygon having an even number of vertices. This is because a regular polygon having an even number of vertices is a shape having a point symmetry about its center, and because, if the joint material has such a shape, stresses applied to two points at point symmetrical positions about the center of the joint material during curing shrinkage of the joint material are generated symmetrically about the center of the joint material such that misalignments with respect to the adjusted positions of the optical lenses 7a to 7d respectively disposed on the joint materials are inhibited.

While the first to third embodiments have been described with respect to a case where an ultraviolet curing type of resin adhesive is used as a joint material for fixing optical lenses, a heat curing type of resin adhesive or solder may alternatively be used.

While the first to third embodiments have been described with respect to a case where optical lenses are used as optical components, wavelength selecting filters or reflecting mirrors may alternatively be used.

While the optical lenses are placed after the resin adhesive is applied on the substrate in the first to third embodiments, the process may alternatively be such that the resin adhesive is applied on the bottom surface of each optical lens in advance and the optical lens is thereafter placed on the substrate.

While the third embodiment has been described with respect to a case where the same polymer material as the pieces of resin adhesive 8a to 8d is used as a material forming the joint material application regions 52f-1 to 52f-4, a metallic member processed so as to be made hydrophilic may alternatively be used. Also, while the embodiment has been described with respect to a case where a fat or oil material is used as a material forming the joint material non-application region 52g, a metallic member processed so as to be water-repellant may alternatively be used.

Obviously many modifications and variations of the present invention are possible in the light of the above teachings. It is therefore to be understood that within the scope of the appended claims the invention may be practiced otherwise than as specifically described.

The entire disclosure of Japanese Patent Application No. 2015-210486 filed on Oct. 27, 2015 including specification, claims, drawings and summary, on which the Convention priority of the present application is based, is incorporated herein by reference in its entirety.

The invention claimed is:

1. A wavelength-multiplexing optical communication module comprising:
   a substrate;
   a plurality of light sources on the substrate;
   a plurality of joint materials separately disposed on the substrate at positions respectively corresponding to the plurality of light sources; and
   a plurality of optical components fixed on the substrate by means of the plurality of joint materials respectively,
   wherein the substrate includes a plurality of forming portions, the plurality of said forming portions including recesses, which recesses respectively form peripheries of the plurality of joint materials into shapes of circles or regular polygons having an even number of vertices, the joint materials being disposed only within the recesses, and
   light-receiving regions of the plurality of optical components are not covered by the plurality of joint materials.

2. The wavelength-multiplexing optical communication module of claim 1, wherein the plurality of forming portions include recesses formed on the substrate and the joint materials fill the recesses.

3. The wavelength-multiplexing optical communication module of claim 1, wherein the plurality of forming portions include joint material application regions where the joint materials are applied and organic films provided on peripheries of the joint material application regions.

4. The wavelength-multiplexing optical communication module of claim 1, wherein the plurality of forming portions include joint material application regions where the joint materials are applied and joint material non-application regions provided on peripheries of the joint material application regions.

5. The wavelength-multiplexing optical communication module of claim 4, wherein the joint materials are resin adhesives,
   the joint material application regions are formed of a same polymer material as the resin adhesives or a metallic member processed so as to be made hydrophilic, and
   the joint material non-application regions are formed of a fat or oil material or a metallic member processed so as to be water-repellant.

6. The wavelength-multiplexing optical communication module of claim 4, wherein the joint materials are solder,
   the joint material application regions are formed of a metallic member processed so as to be made hydrophilic, and
   the joint material non-application regions are formed of a fat or oil material or a metallic member processed so as to be water-repellant.

7. A wavelength-multiplexing optical communication module comprising:
   a substrate;
   a plurality of light sources on the substrate;
   a plurality of joint materials separately disposed on the substrate at positions respectively corresponding to the plurality of light sources; and
   a plurality of optical components fixed on the substrate by means of the plurality of joint materials respectively,
   wherein the substrate includes a plurality of forming portions, the plurality of said forming portions including recesses, which recesses respectively form peripheries of the plurality of joint materials into shapes of circles or regular polygons having an even number of vertices, the joint materials being disposed only within the recesses, and
   said optical components comprise at least a plurality of wavelength selecting filters, a single optical coupler, and a single mirror, such that each of the plurality of wavelength selecting filters corresponds to a respective light source of the plurality of light sources.

8. The wavelength-multiplexing optical communication module of claim 1, wherein the plurality of light sources are supplied with electrical signals and output optical signals.

9. The wavelength-multiplexing optical communication module of claim 1, wherein output beams of the plurality of light sources are made incident on side surfaces of the plurality of optical components respectively.

* * * * *